Jan. 9, 1923.
W. R. MACKNESS.
1,441,440.
DEVICE FOR MEASURING SHEETS OF MATERIAL SUCH AS PAPER, CARDBOARD, METAL, AND THE LIKE.
FILED NOV. 7, 1916.
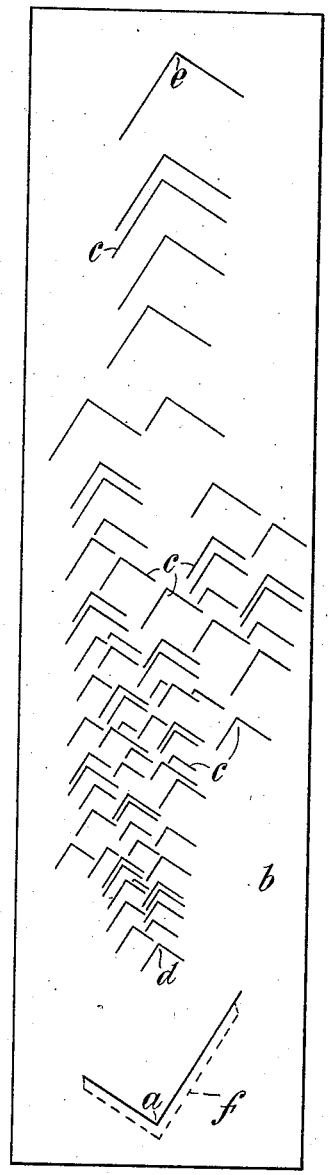
WITNESSES.
INVENTOR,
William R. Mackness,
BY
ATTY.

Patented Jan. 9, 1923.

1,441,440

UNITED STATES PATENT OFFICE.

WILLIAM ROBERT MACKNESS, OF HAMPSTEAD, LONDON, ENGLAND.

DEVICE FOR MEASURING SHEETS OF MATERIAL SUCH AS PAPER, CARDBOARD, METAL, AND THE LIKE.

Application filed November 7, 1916. Serial No. 130,052.

*To all whom it may concern:*

Be it known that I, WILLIAM ROBERT MACKNESS, a subject of His Majesty the King of England, and resident of Hampstead, in the county of London, Kingdom of England, have invented certain new and useful Improved Devices for Measuring Sheets of Material Such as Paper, Cardboard, Metal, and the like, of which the following is a specification.

This invention relates to an improved device for measuring sheets of material such as paper, cardboard, metal, and the like.

The invention has for its object to provide a simple and inexpensive device for use by manufacturers, merchants, buyers, commercial travellers, and others to enable them to quickly and easily ascertain the standard size, and the untrimmed or trimmed standard size, and the technical name corresponding or equivalent to that size, of any sheet or piece of paper, cardboard, metal or other material, or, if not of a standard size, or the untrimmed or trimmed standard size, the nearest standard size, and the untrimmed or trimmed standard size, and the extent to which said sheet or piece has been reduced or cut down at the top and bottom or at the sides or both.

According to the invention the device comprises a measure or scale in the form of a plate, sheet, strip or disc on one or both surfaces of which are inscribed or otherwise formed one or more sets of oppositely disposed angles or of lines or other suitable forms or marks representing or indicating the extremities of the diagonals and the relative positions or directions in which they fall when the material to be measured is placed in an arbitrary and pre-arranged position upon the device.

In a suitable manner of carrying out the invention illustrated in the accompanying drawing, a right angle $a$ is inscribed or formed by means of two lines on the surface of a plate, sheet or strip $b$, or of a disc, and preferably at the bottom righthand corner of the same, which right angle serves as a base from which the measurements are made. Other right angles $c$ are also inscribed or formed on the surface at different distances from the base angle $a$, which distances correspond to various standard sizes, and untrimmed or trimmed standard sizes, and which angles $c$ accordingly serve to indicate the size of the particular sheet of material being measured. A convenient measure or scale would consist, as illustrated, of a sheet, plate or strip of stout paper or metal measuring about $6\frac{1}{2}$ inches by 29 inches and adapted to indicate 72 of the most important sizes of printing papers, ranging from foolscap 32mo ($3\frac{3}{8}''$ x $2\frac{1}{8}''$), $d$, through crown, large post, demy and medium to royal folio ($20''$ x $12\frac{1}{2}''$), $e$, the angles $c$ representing twelve subdivisions of each of the full sizes.

To use the above decribed form of the device, one of the bottom corners, preferably the bottom right-hand corner, of the sheet or section of paper or other material to be measured is placed squarely in the large base right angle $a$ at the bottom of the measure or scale and the standard or nearest standard size, or untrimmed or trimmed standard size, of the sheet is ascertained by noticing the particular indicating angle $c$ into which the diagonally opposite and extreme top left hand corner of the sheet fits or nearly fits. If it does not fit exactly, and provided the sheet is set squarely, the extent of cutting down from standard size, or untrimmed or trimmed standard size, will be shown.

It is to be understood that in the use of the term angles, it is contemplated within the scope of the invention to employ diagonal representing lines, arrow heads, spots, or other marks representing the extremities of diagonals by which the material can be measured.

This system of measuring can be applied to articles whose dimensions are known either technically by a name corresponding to them, or by their actual measurements, or both, such as printing papers, writing papers, account book papers, note and letter papers, wrapping and packing papers, duplicating papers, carbon papers, photographic papers and plates, linen or silk used for drawing, painting and printing purposes, drawing papers and canvases, blotting papers, envelopes, cards, cardboards, strawboards, tin, steel, iron, and other metal plates, type for printing (especially large sizes) and the like.

The measure or scale can be made of any material that answers the purpose, such as wood, glass, celluloid, mica, cardboard, ivory, bone, linen or metal, it may be in strip form, square, round or any other shape, and it can be made in any size. If desired the lines forming the indicating angles $c$ can be prolonged so as to extend partly or wholly along the sides or the tops and bottoms, or both, of the sheets or pieces of paper which are measured. The sizes may be based on measure only, whether the dimensions are according to English, metric, or any other measure, or only by the technical names which denote sizes, or by both. The number of indicating or measuring angles or lines can be increased or decreased and all or any of said angles may be enclosed in longer or shorter lines, and the lines may be solid, dotted, broken, or any other kind of line or a combination of all or any number of these. The measuring angles or lines can be placed in any positions and number on the surface or surfaces of the scale according to the sizes and number of sizes of the articles for which said scale is designed. The large or base right angle $a$ at the bottom of the scale may be arranged on the right as above-mentioned with the other angles running upwards or leftwards, or on the left with the measuring angles disposed upwards or towards the right. Parts of the lines of the bottom right angle and the other angles, or parts of the diagonal representing lines or other forms could be perforated if desired in order to enable the separate sizes to be transferred or marked through the measure upon some other material. The angles, lines or marks, and any suitable scale therefor to determine the different sizes upon the measure may be painted or printed in different colours.

More than one set of angles, lines or marks may be provided on the device, each set to enable a particular class of material to be measured.

The base angle may be formed or re-inforced by an angular member such as $f$ secured or formed on the plate, sheet, strip or disc, or it may be formed by recessing the material of said sheet or the like, either of which arrangements would prevent shifting and facilitate adjustment of the piece of material being measured. Instead of providing a base angle on the surface of the plate, sheet, strip or disc, said angle may be formed by one of the bottom corners of said plate, sheet, strip or disc itself.

What I claim is:—

1. A device for measuring sheets of material such as paper, cardboard, metal and the like, comprising a flat sheet provided with intersecting lines forming a base right angle for predeterminedly positioning the material to be measured, and a plurality of pairs of intersecting lines, each pair forming a right angle, said right angles being spaced at varying distances from and cooperating with the base right angle for indicating the standard sizes of rectangular sheets in accordance with the length and width thereof.

2. A device for measuring sheets of material such as paper, cardboard, metal and the like, comprising a body made from a flat sheet and provided with a pair of intersecting lines for predeterminedly positioning the material to be measured, and a plurality of indicating marks spaced in different directions from and cooperating with the intersecting lines to define the area of rectangular sheets of various widths and lengths when said sheets are positioned by said intersecting lines.

In testimony whereof I have signed my name to the said specification.

WILLIAM ROBERT MACKNESS.